United States Patent [19]
Thompson, Jr.

[11] 3,865,220
[45] Feb. 11, 1975

[54] BICYCLE HUB

[76] Inventor: William A. Thompson, Jr., 131 Cranmoor Dr., Toms River, N.J. 08753

[22] Filed: May 30, 1972

[21] Appl. No.: 258,055

[52] U.S. Cl............................ 192/46, 192/64
[51] Int. Cl............................ F16d 41/00
[58] Field of Search...................... 192/46, 64

[56] References Cited
UNITED STATES PATENTS

| 351,735 | 11/1886 | Brill | 192/46 |
| 416,996 | 12/1889 | Cook | 192/46 |
| 487,768 | 12/1892 | Pfingst | 192/46 |
| 500,529 | 6/1893 | Burns | 192/46 |
| 1,361,757 | 12/1920 | Emerson | 192/64 |
| 3,135,564 | 6/1964 | Agens | 308/DIG. 7 |
| 3,200,918 | 8/1965 | Horn | 192/64 |
| 3,486,597 | 12/1969 | Carlton | 192/46 |
| 3,650,363 | 3/1972 | Cristie | 192/64 |

FOREIGN PATENTS OR APPLICATIONS

| 542,987 | 7/1932 | Germany | 192/64 |
| 132,906 | 7/1902 | Germany | 192/64 |
| 357,907 | 3/1938 | Italy | 192/64 |

Primary Examiner—Allan D. Herrmann
Attorney, Agent, or Firm—Brumbaugh, Graves, Donahue & Raymond

[57] ABSTRACT

A bicycle hub which may be formed of plastic includes a housing formed with an axial chamber opening at one end of the housing which receives an axial insert therein. Three fingers extend from one end of the insert and are slidably received in three slots in the housing. Six radially extending teeth are formed on the axial face at the other end of the insert and engage matching teeth on an abutting face of a sprocket wheel rotatably mounted at the open end of the housing. A spring biases the two toothed faced into engagement to provide torque transmission in one direction and free overrunning in the other direction.

13 Claims, 3 Drawing Figures

BICYCLE HUB

BACKGROUND OF THE INVENTION

A recent revival of interest in bicycling has resulted in a severe shortage of bicycle parts and a corresponding increase in their price. The shortage results from the inability of bicycle manufacturers to increase their production sufficiently to satisfy the increased demand. The principle reason for this inability to increase production is the intricate nature of the existing bicycle hubs which makes fabrication and assembly of the bicycle hub a slow and expensive procedure.

All presently available bicycle hubs are fabricated of metal parts, many of which must be machined. In addition, the overrunning clutch mechanism in existing bicycle hubs is formed of a multiplicity of parts which must be individually fabricated and assembled by hand. The necessity of individually machining a multitude of parts and assembling them by hand has produced the high cost and scarcity of present day bicycle hubs.

A further defect in the design of currently available metal bicycle hubs, in addition to the problems of cost and availability, is the necessity of constant lubrication to overcome the friction between the multitude of component parts. To assure that adequate lubrication is available, the user frequently applies an excess of lubricant which then leaks out of the mechanism, spreads over the hub, and travels down the spokes to the bicycle rim. The result is a dirty appearance and requires frequent cleaning of the bicycle.

An attendant disadvantage of an oily hub is that gritty dirt collects on the oily surface and then works its way into the bearing surfaces and other moving parts which results in wear and shortened hub life. Then, when the hub breaks down or when one of the many component parts fails, the intricate nature of the hub requires the lengthy attention of a highly skilled and highly paid bicycle mechanic. Furthermore, because of the scarcity of component parts, a replacement for the broken part may be unavailable, thereby necessitating either custom machining of a new part or purchasing a new bicycle.

Another defect of presently available hubs is their weight. Weight considerations in bicycle engineering are of paramount importance because the motive power for the bicycle must be supplied by the user. Thus, lightweight bicycles are easier and less tiring to pedal uphill than heavy bicycles. The lighter bicycle, other considerations being equal, will always be preferred by the public.

One additional problem frequently encountered by owners of prior art bicycles is the presistant scourge of rust. It is common for bicycle owners, particularly children, to leave their bicycles in the rain, with the result that water may work in the intricate interior of the bicycle hub and wash out, emulsify or otherwise shorten the life of the lubricant with the result that the hub mechanism becomes rusted and corroded. Once that has occurred, high friction will develop within the mechanism, and this friction can never be eliminated by adding lubricant. The only effective solution is to replace the hub.

SUMMARY OF THE INVENTION

Accordingly, this invention provides a bicycle hub which may be used interchangably with conventional bicycle hubs on conventional metal bicycle frames, and also is specifically designed for use on a bicycle frame disclosed and claimed in my copending application, Ser. No. 319,843 filed Dec. 29, 1972. This bicycle hub represents an advance in the art of bicycle hubs because, inter alia, it is light in weight, durable and inexpensive. In addition, it is fabricated of very few moving parts all of which may be fabricated entirely of self-lubricating plastic and easily and quickly assembled and repaired. This bicycle hub is absolutely immune to corrosion and requires no lubrication whatsoever.

A bicycle hub according to this invention includes a housing and a sprocket wheel rotatably mounted at one end of the housing. An axially shiftable insert is interposed between the housing and the sprocket wheel, maintaining constant torque transmission engagement with one, and one-way torque transmission engagement with the other. The housing, the sprocket wheel and the insert are particularly suitable for fabrication entirely of plastic.

DESCRIPTION OF THE DRAWINGS

A better appreciation of the invention and its many attendant advantages will appear as the same becomes better understood by reference to the following written description of a preferred embodiment when read in conjunction with the appended drawings wherein.

DESCRIPTION OF THE PREFERRED EMBODIMENT

Figure 1:
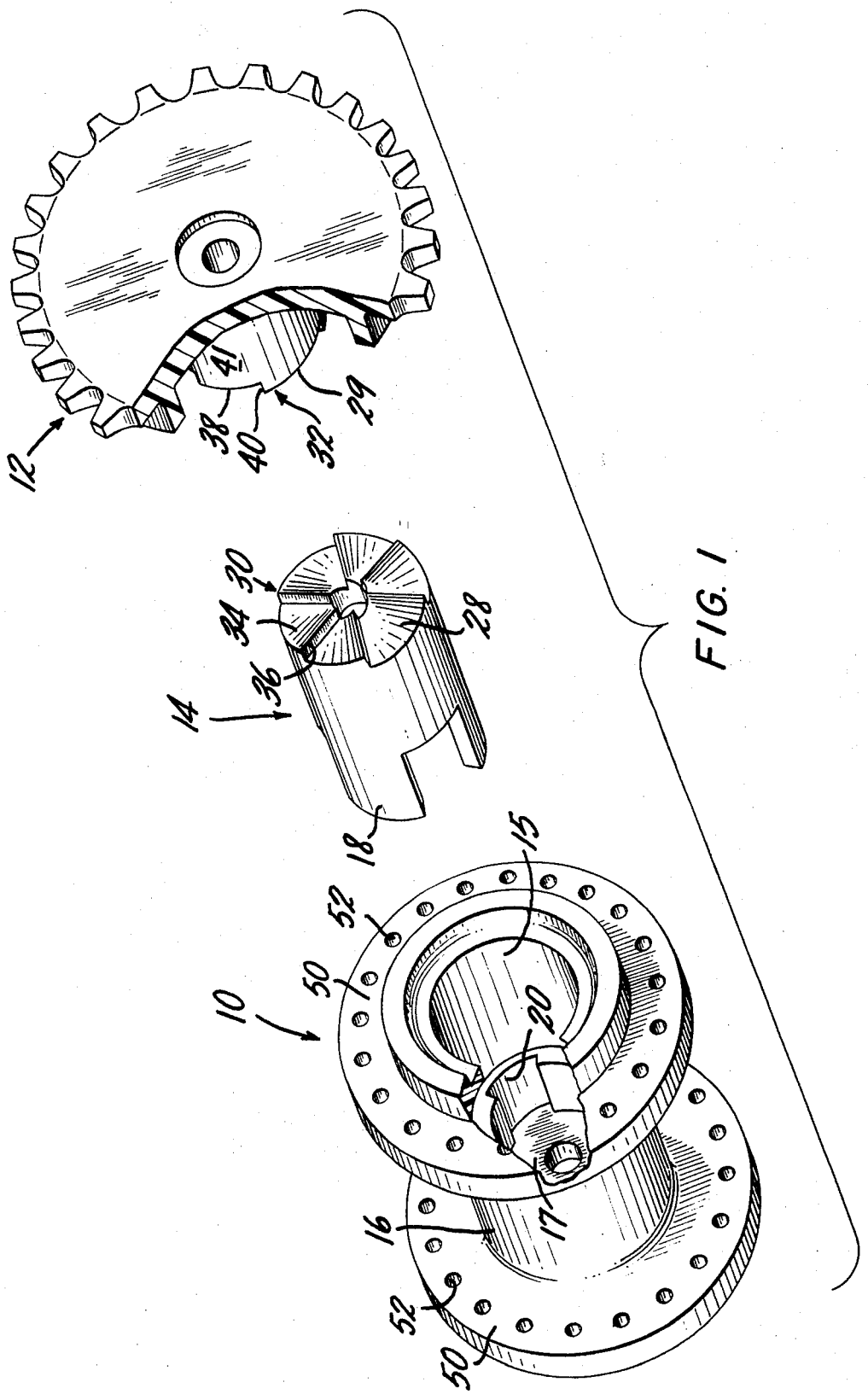
FIG. 1 is an exploded isometric view of the hub of the present invention.

Referring now to the drawings wherein like reference numerals designate identical or corresponding parts and more particularly to FIG. 1 thereof, a bicycle hub according to the present invention includes a housing 10 and a sprocket wheel 12 rotatably mounted on one end of the housing 10. An insert 14 is interposed between the housing 10 and the sprocket wheel 12 and provides one-way torque transmission therebetween.

Figure 2:
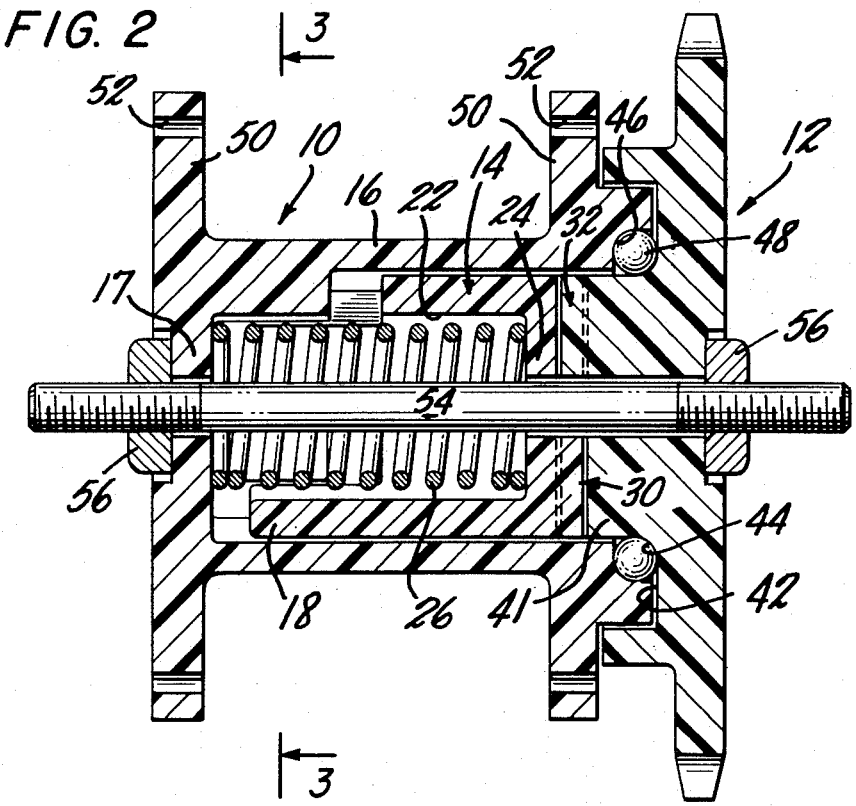
FIG. 2 is a cross-sectional elevation of the assembled bicycle hub shown in FIG. 1.
Figure 3:
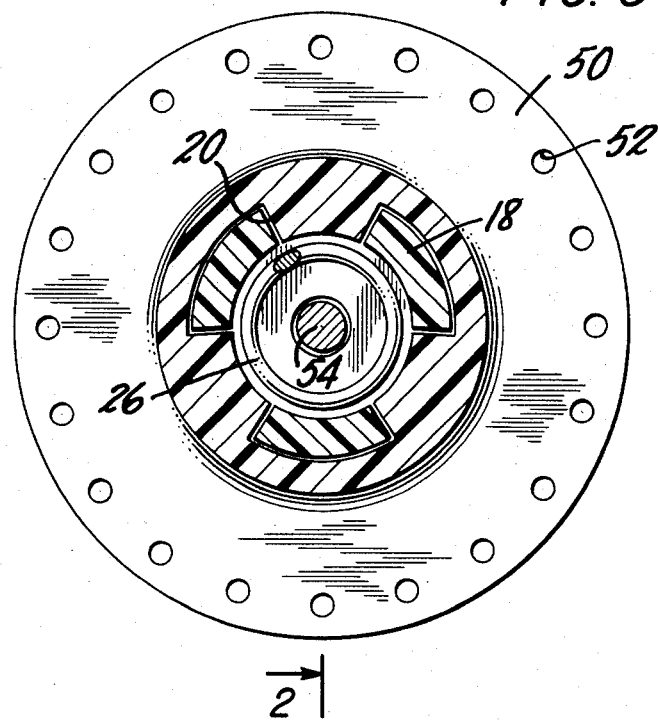
FIG. 3 is a cross-section along lines 3—3 in FIG. 2.

The insert 14 is slidably received within an axial chamber 15 in the housing 10 defined by a cylindrical wall 16 and a centrally apertured end closure 17. Three axially extending fingers 18 extend from the left hand axial end of the insert 14 as shown in FIGS. 1 and 2. The fingers or keys 18 are slidably received in three axially extending slots or recesses 20 formed in the left hand or the interior end of the chamber 15, and the meshing of the fingers 18 into the slots 20 forms a spline means, that is, a constant torque transmission engagement between the insert 14 and the housing 10, while permitting axial translation therebetween.

The insert 14 is formed in the shape of a cylinder having a cavity 22 closed at one end by a centrally apertured end plate 24. A compression spring 26 is received within the cavity 22 and compressed between the inner face of the end plate 24 of the insert 14 and the inner face of the closure 17 of the housing 10 to bias the insert 14 to the right, as illustrated in FIG. 2, against the sprocket wheel 12.

The outer face 28 of the end plate 24 of the insert 14, that is the right hand face as shown in FIGS. 1 and 2, forms a one-way torque transmission interface with the inner face 29 of the sprocket wheel 12, that is, the left hand face, as illustrated in FIGS. 1 and 2. This one-way torque transmission interface includes a plurality of radially extending angularly sloping teeth 30 formed on the outer axial face 28 of the end plate 24 of the insert 14, and a corresponding number of cooperating teeth 32 formed in the abutting face 29 of the sprocket wheel 12. The teeth 30 and 32 are cooperatively formed with a generally axially facing sloping face 34 and 38 respectively and a generally diametrically facing vertical face 36 and 40 respectively, the plane of which also contains the axis of the hub. When the teeth 30 and 32 are engaged, rotation of the sprocket wheel 12 in the clockwise direction as illustrated in FIG. 1, that is, the peddling direction, will cause the vertical faces 36 of the teeth 30 to engage the vertical face 40 of the teeth 32 to transmit torque from the sprocket wheel 12 to the insert 14 by way of the teeth 30 and thence to the housing 10 by way of engagement of the fingers 18 in the slots 20 of the housing 10. The plane of the vertical faces 36 and 40 may be undercut or inclined slightly in the same direction as the sloping faces 34 and 38 to more securely engage the torque transmission interface when peddling.

Reverse relative rotation of the sprocket member 12 with respect to the housing 10 will cause the sloping faces 34 and 38 of the teeth 30 and 32 respectively to slide over one another thereby converting clockwise torque exerted by clockwise rotation of the hub 10 on the insert 14 to an axial force that is effective to push the insert 14 against the spring 26 out of torque transmission engagement with the inner face 29 of the sprocket wheel 12. Of course, some slight torque will be transmitted by this reverse rotation, but it will not be of significant magnitude, that is, it will be on the same order of magnitude in presently available bicycle hubs during reverse rotation.

The teeth 30 on sprocket wheel 12 are formed on the inner axial face 29 of a cylindrical portion 41 which fits within the chamber 15 of the housing 10. The cylindrical portion 41 terminates at an axial face 42 and the junction of the cylindrical portion 41 and the axial face 42 forms a bearing race 44. A corresponding bearing race 46 is formed in the inside peripheral corner of the end of the cylindrical portion 16 of the housing 10. A plurality of ball bearings 48, preferably formed of a melamine resin, are contained between the facing surfaces of the bearing races 44 and 46 to provide rotational support between the housing 10 and the sprocket wheel 12. Alternatively, Teflon coated stainless steel bearings using surfaces 44 and 46 as races may be used, and also conventional stainless steel bearings with conventional races are feasible but less desirable substitutes.

A pair of circumferential, radially extending flanges 50 are formed on the axial ends of the housing 10 and have formed on the peripheral edges thereof means for attaching bicycle spokes, illustrated as longitudinally extending holes 52 through the flanges 50.

A shaft 54 extends axially through the central aperture in the end closure 17 of the housing 10, through the central aperture in the end plate 24 of the insert 14, and through the axial aperture through the sprocket wheel 12. The ends of the shaft 54 are threaded and engage a pair of fasteners 56 which hold the sprocket wheel 12 against the axial translation relative to the housing 10. The ends of the shaft 54 are supported within a pair of brackets secured to the opposite sides of the lower rear corner of a bicycle frame (not shown) for rotational support of the wheel.

Every member of the above-described bicycle hub exclusive of the shaft 54 and the spring 26 are formed of a tough plastic material such as VALOX 420, a thermoplastic resin made by General Electric Corporation. Plastic molding of these parts is made possible by the use of very few parts and the simple and sturdy design of these parts. The use of few and easily fabricated parts also facilitates easy and rapid assembly and repair and thus minimizes the cost of the product. The plastic selected is engineered to be self-lubricating to eliminate the need for conventional lubrication such as grease and oil and therefore the hub remains oil-free at all times and thereby eliminates the tendency for dirt and grit to collect on the hub and work into the bearing surfaces. The working life of the hub is thereby substantially extended beyond that of prior art bicycle hubs.

Obviously, numerous changes and modifications of this bicycle hub are possible in the light of the foregoing disclosure. For example, other forms of spline connection between the insert 14 and the housing 10 herein provided by the meshing finger 18 and slot 20 arrangement are possible. Moreover, it is possible to reverse the insert 14 and make the one-way torque transmission face be the interface between the insert 14 and the housing 10, while the two-way torque transmission interface is between the insert 14 and the sprocket wheel 12. It is therefore to be expressly understood that the invention may be practiced otherwise than as specifically disclosed herein while still remaining within the spirit and scope of the appended claims.

I claim:

1. A plastic bicycle hub, comprising:
   a housing, formed entirely of plastic, having means for attachment of bicycle spokes;
   a sprocket wheel, formed entirely of plastic, mounted at one end of said housing for rotation relative thereto;
   one-way torque transmission means, formed entirely of plastic, disposed within said housing and interposed between said housing and said sprocket wheel for transmitting torque of significant magnitude from said sprocket wheel to said housing in only one direction, and allowing said sprocket wheel to rotate freely in the other direction with respect to said housing without transmission of torque of significant magnitude between said housing and said sprocket wheel,
   said one-way torque transmission means including an insert member disposed within said housing and formed entirely of plastic;
   said insert member being axially shiftable with respect to said housing and said sprocket wheel, and including two-way torque transmitting means formed thereon for providing continuous two-way torque transmitting engagement with one of said housing and said sprocket wheel, whereby said insert member rotates continuously with said one of said housing and said sprocket wheel;
   said insert member also including one-way torque transmitting means formed on one axial face of said insert member for transmitting torque in one direction to the other of said housing and said sprocket wheel, and for converting torque in the other direction to an axial force to shift said insert axially out of torque transmitting engagement with said other of said housing and said sprocket wheel; and said hub further comprising biasing means for biasing said insert directly into torque transmitting engagement with the other of said housing and said sprocket wheel.

2. A plastic bicycle hub as defined in claim 1, wherein said sprocket wheel is mounted on one end of said housing and rotatably supported thereon by means of ball bearings formed entirely of plastic.

3. A plastic bicycle hub, comprising:
a housing, formed entirely of plastic;
means on said housing for attachment of bicycle spokes;
means formed in said housing defining an axial chamber;
a sprocket wheel, formed entirely of plastic, mounted at one end of said housing for rotation relative thereto;
one-way torque transmission means interposed between said housing and said sprocket wheel for transmitting torque of significant magnitude from said sprocket wheel to said housing in only one direction, and allowing said sprocket wheel to rotate freely in the other direction with respect to said housing without transmission of torque of significant magnitude between said housing and said sprocket wheel;
said one-way torque transmission means comprising an insert member disposed within said housing axial chamber and formed entirely of plastic;
said insert member being axially shiftable in said chamber with respect to said housing and said sprocket wheel, and including torque transmitting means formed on said insert member for providing continuous two-way torque transmitting engagement with one of said housing and said sprocket wheel, and also including one-way torque transmission means formed on said insert member for transmitting torque in only one direction between said insert member and the other of said housing and said sprocket wheel, and for converting torque in the other direction to an axial force to shift said insert axially out of torque transmitting engagement with said other of said housing and said sprocket wheel;
said two-way torque transmitting engagement being provided by cooperating spline means formed on said insert member and on said one of said housing and said sprocket wheel for providing said continuous torque transmitting engagement with said insert while permitting relative axial movement between said insert and said one of said housing and said sprocket wheel.

4. A plastic bicycle hub as defined in claim 3, wherein:
said spline means comprises means formed in said housing defining a plurality of axially extending slots spaced around the axis of said hub; and
said insert further comprises axially extending fingers extending from one face of said insert, said fingers extending into said slots to provide said continuous torque transmitting engagement between said insert and said housing.

5. A plastic bicycle hub as defined in claim 3, wherein:

said insert further comprises means formed therein defining an axial cavity; and
said biasing means includes a compression spring received within said cavity and compressed between an inside face of said chamber and an inside face of said cavity.

6. A plastic bicycle hub, comprising:
a housing, formed entirely of plastic, having means for attachment of bicycle spokes;
a sprocket wheel, formed entirely of plastic, mounted at one end of said housing for rotation relative thereto;
one-way torque transmission means, formed entirely of plastic, disposed within said housing and interposed between said housing and said sprocket wheel for transmitting torque of significant magnitude from said sprocket wheel to said housing in only one direction, and allowing said sprocket wheel to rotate freely in the other direction with respect to said housing without transmission of torque of significant magnitude between said housing and said sprocket wheel;
said one-way torque transmission means including an insert member disposed within said housing and formed entirely of plastic;
said insert member being axially shiftable with respect to said housing and said sprocket wheel, and including torque transmitting means formed thereon for providing continuous two-way torque transmitting engagement with one of said housing and said sprocket wheel, and also including one-way torque transmission means formed on one axial face of said insert member for transmitting torque in one direction to the other of said housing and said sprocket wheel and for converting torque in the other direction to an axial force to shift said insert axially out of torque transmitting engagement with said other of said housing and said sprocket wheel;
said one-way torque transmission means including a plurality of teeth formed on one of said insert and said sprocket wheel, and a plurality of cooperating teeth on the other of said insert and said sprocket wheel, said teeth being formed with one sloping face and one face substantially parallel to the axis of said hub; and
said hub further comprises biasing means for biasing said insert into engagement with the other of said housing and said sprocket wheel.

7. A plastic bicycle hub as defined in claim 6, wherein said housing further comprises:
means formed therein defining an axial chamber for receiving said insert; and
spline means formed within said chamber for continuously engaging said insert.

8. A plastic bicycle hub as defined in claim 7, wherein:
said spline means comprises means formed in said housing defining a plurality of axially extending slots equally spaced around the axis of said hub;
said insert further comprises a plurality of axially extending fingers extending from one face of said insert, said fingers extending into said slots to provide said continuous two-way torque transmitting engagement between said insert and said housing;
said insert further comprises means formed therein defining an axial cavity; and said biasing means includes a compression spring received within said cavity and compressed between an inside face of said chamber and an inside face of said cavity.

9. A bicycle hub having a housing with spoke attachment means formed thereon and a sprocket wheel mounted at one end of the housing for rotation relative thereto, wherein the improvement comprises:
- means formed within said housing defining an axial chamber and having spline means formed therein;
- an insert axially shiftable with respect to said housing and said sprocket wheel;
- cooperating spline means formed on said insert and engaged with said chamber spline means for maintaining continuous two-way torque transmission between said housing and said hub while permitting relative axial translation therebetween;
- cooperating teeth formed on adjacent surfaces of said insert and said sprocket wheel for transmitting torque of a substantial magnitude in only one direction and for converting torque in the other direction to an axial force to shift said insert axially out of torque transmitting engagement to allow for torqueless overrunning in said other direction; and
- biasing means for biasing said insert into engagement with said sprocket wheel.

10. A bicycle hub as defined in claim 9, wherein said chamber spline means includes means formed in said housing defining a plurality of axially extending radial slots, and said cooperating spline means on said insert includes a plurality of axially extending fingers meshed with said slots.

11. A bicycle hub having a housing with spoke attachment means formed thereon and a sprocket wheel mounted at one end of the housing for rotation relative thereto, wherein the improvement comprises:
- a unitary insert axially aligned within said housing and axially shiftable with respect to said housing and said sprocket wheel,
- said insert having torque transmitting means formed thereon for providing a continuous two-way torque transmitting engagement with one of said housing and said sprocket wheel such that said insert rotates continuously with said one of said housing and said sprocket wheel,
- said insert also having a one-way torque transmission means formed on one axial face thereof for transmitting torque of a substantial magnitude in only one direction to the other of said housing and said sprocket wheel, and for converting torque in the other direction to an axial force to shift said insert axially out of torque transmitting engagement with said other of said housing and said sprocket member; and
- biasing means for biasing said insert directly into torque transmitting engagement with said other of said housing and said sprocket wheel.

12. A cycle hub, comprising:
- a circular sprocket wheel formed entirely of plastic;
- a cylindrical boss formed coaxially on said sprocket wheel and having a free end on which are formed a plurality of teeth each having an engaging surface lying in a plane through and parallel to the axis of said hub, and an overrunning surface diverging from said engaging surface to form an axially extending tooth narrower at its free end than at its base connection with said hub boss;
- a hub housing, formed entirely of plastic, coaxially aligned with said sprocket wheel and having means formed therein defining an axial chamber, and having means formed in the wall of said chamber defining a plurality of axially extending recesses;
- an insert member, formed entirely of plastic, having on one end thereof a plurality of teeth similar and opposite in shape to said hub boss teeth, and intermittently disengageable therewith and having a plurality of lugs continuously engageable with said recesses;
- resilient means for urging said insert into engagement with said sprocket wheel boss to effect engagement of said hub boss teeth with said insert member teeth;
- whereby rotation of said sprocket wheel in the driving direction will cause said engaging surfaces of said hub boss teeth to engage said engaging surfaces of said insert member teeth to transmit torque from said sprocket wheel to said insert member, and said continuous engagement of said insert member lugs with said hub housing recesses will effect transmission of torque from said insert member to said housing; and
- whereby relative rotation of said sprocket wheel and said hub housing in the overrunning direction will cause said overrunning surfaces of said hub boss teeth and said insert member teeth to slide relative to one another and cause said insert member to translate axially away from said sprocket wheel against the force of said resilient means to permit said sprocket wheel and said hub housing to rotate relative to each other.

13. A cycle hub, comprising:
- a sprocket wheel;
- a cylindrical boss formed coaxially on said sprocket wheel and having a free end on which are formed a plurality of teeth each having an engaging surface lying in a plane in which lies the axis of said hub, and an overrunning surface diverging from said engaging surface to form an axially extending tooth narrower at its free end than at its base connection with said hub boss;
- a hub housing coaxially aligned with said sprocket wheel;
- a pair of spaced flanges formed on said housing for attachment of spokes by which said hub may be assembled with a cycle wheel;
- means formed in said housing defining an axial chamber, and having means formed in the wall of said chamber defining a plurality of axially extending recesses;
- an insert member having on one end thereof a plurality of teeth similar and opposite in shape to said hub boss teeth, and intermittently disengageable therewith, and having a plurality of keys continuously engaged in said recesses;
- resilient means for urging said insert into engagement with said sprocket wheel boss to effect engagement of said hub boss teeth with said insert member teeth;
- whereby rotation of said sprocket wheel in the driving direction will cause said engaging surfaces of said hub boss teeth to engage said engaging surfaces of said insert member teeth to transmit torque from said sprocket wheel to said insert member, and said continuous engagement of said insert member keys in said hub housing recesses will effect transmission of torque from said insert member to said housing; and whereby relative rotation of said sprocket wheel and said hub housing in the overrunning direction will cause said overrunning surfaces of said hub boss teeth and said insert member teeth to slide relative to one another and cause said insert member to translate axially away from said sprocket wheel against the force of said resilient means to permit said sprocket wheel and said hub housing to rotate relative to each other.

* * * * *